MARION E. HINES
JEAN-CLAUDE R. COLLINET
JOSEPH F. WHITE
*Inventors*

By Rosen & Steinhilper
*Attorneys*

MARION E. HINES
JEAN-CLAUDE R. COLLINET
JOSEPH F. WHITE
*Inventors*
By Rosen & Steinhilper
*Attorneys*

MARION R. HINES
JEAN-CLAUDE R. COLLINET
JOSEPH F. WHITE
*Inventors*

By ROSEN & STEINHILPER
*Attorneys*

United States Patent Office 3,516,015
Patented June 2, 1970

3,516,015

TUNABLE CAVITY NEGATIVE RESISTANCE MICROWAVE AMPLIFIERS AND OSCILLATORS

Marion E. Hines, Weston, Jean-Claude R. Collinet, North Reading, and Joseph F. White, Lexington, Mass., assignors to Microwave Associates, Inc., Burlington, Mass., a corporation of Massachusetts Continuation-in-part of application Ser. No. 704,817, Feb. 12, 1968. This application Dec. 20, 1968, Ser. No. 785,322
Int. Cl. H03b 7/14; H03f 3/10
U.S. Cl. 331—96 16 Claims

ABSTRACT OF THE DISCLOSURE

A microwave circuit including an electron discharge device capable of being biased for negative resistance at frequencies in a selected band, which will provide a reduced bandwidth of electrical resonance for precise tuning at a given frequency of operation in that band and avoid other undesired modes of electrical oscillation. Undesired or "spurious" modes of oscillation for the network which occur at frequencies different from those in the desired band are in a frequency range or ranges where the negative resistance of the electron discharge device is ineffective. Appropriate network design criteria are described for eliminating spurious modes, in a network comprising at least one electron discharge device capable of being biased for negative resistance, coupled into a primary resonator loop so that the network may oscillate or amplify.

RELATED APPLICATIONS

This application is a continuation-in-part of application Ser. No. 704,817 filed Feb. 12, 1968, by Marion E. Hines one of the joint inventors of the present application, and assigned to the same assignee as the present invention.

BACKGROUND OF THE INVENTION

The basic purpose of this invention is to provide a simple and convenient low-cost technique for frequency control of an electrical network for microwave generation or amplification, including an electron discharge device which is capable of generating high frequency oscillations over particular ranges of frequencies when suitably biased by a battery or other source of power. The electrical network is to have a narrow bandwidth electrical resonance characteristic for precise control of the frequency of oscillation, and is so designed as to inhibit oscillation in other modes than the one desired.

One suitable electron discharge element is the Read avalanche diode or other PN junction diode biased into reverse avalanche discharge. This is a semiconductor P-N junction device first described by Read.[1] Alternative forms have been described by DeLoach et al.[2] Another suitable semiconductor device is the Gunn diode[3] which consists of a wafer of gallium arsenide biased with a DC source. Gallium arsenide devices operating in the "LSA" mode are also suitable, as described by Copeland.[4] Transistor type structures may also be used if

[1] W. T. Read, "A proposed high frequency negative-resistance diode," Bell Systems Tech. Journal, pp. 401–466, March 1968.

[2] R. L. Johnston, B. C. DeLoach, Jr., B. G. Cohen, "A Silicon Diode Microwave Oscillator," Bell Systems Tech. Journal, pp. 316–372, February 1965.

[3] J. B. Gunn, "Microwave Oscillations of Current in III–V Semiconductors," Solid State Comm. vol. 1, pp. 87–91, September 1963.

[4] J. A. Copeland, "L.S.A. Oscillator Diode Theory," Journal of Applied Physics, pp. 3096–3101, July 1967.

these can be arranged in an elementary form which provides a negative-resistance at high frequency at two terminals. Still other forms might include PNPN type semiconductor diodes, high vacuum electron tubes, tunnel diodes, and the like. This invention is not primarily concerned with the internal structures of these electron discharge devices, but rather with the combination of such devices as elements in circuits and structures in which they are placed. The invention applies to the application of any type of such oscillating or negative-resistance electron discharge device, including those not mentioned above or new types which are yet to be discovered.

Previous techniques for obtaining narrow bandwidth resonance in microwave oscillators have, in general, required more complex electrical circuits with additional modes of resonance, or have been limited in their quality factor Q by inherent circuit losses. There is, for example, the technique of placing a small electron discharge element across a high voltage gap in a single resonator or cavity. The relatively low impedance of the element causes high resistive losses in the resonator. Another approach has been to place the electron discharge element at the base of a coaxial structure approximately a quarter wavelength long and opened at the other end, or at the base of a coaxial structure approximately one half wavelength long and short-circuited at the other end. This results in a low-Q microwave circuit as the electron discharge element which is lossy by nature from its inherent parasitic components, is a part directly of the coaxial cavity. The electron discharge element can also be part of the center conductor of a long coaxial cavity several wavelengths long. Undesired resonant frequencies will occur in this case. At microwave frequencies the shortest coaxial resonant circuit is often so small it is impractical for use with a diode of normal package size.

A stabilizing cavity, more commonly called "Stalo" is also a means of controlling frequency. Commonly, such a cavity is used as a narrow-band transmission wave filter inserted into the output transmission line. Its use is very critical to environmental variations and mistuning of the stabilized primary oscillator coupled to it. The insertion loss may also become excessive when strong stabilization is required.

A basic problem in combining an active negative-resistance element with a separate resonator for oscillation or amplification in a given frequency band is that of "moding," in which spurious or undesired modes of oscillation will occur at frequencies different from those in the desired band. At high frequencies, complex networks containing many electrical impedance components generally have many "normal modes" of possible transient oscillation. When a negative-resistance element is included in such a network, continuous or erratic oscillations can occur in such modes if their resonant frequencies lie in a frequency range where the negative-resistance of the element is effective. Such oscillations are called "spurious modes" when the involved undesired frequencies or internal electrical field patterns differ from the ones desired. The presence of spurious modes of oscillation will diminish the usefulness of a circuit or system for most applications.

It is a feature of this invention that spurious modes may be eliminated by appropriate network design criteria to be described.

In the accompanying drawings, FIG. 1 shows a qualitatively-sketched graph illustrating the behavior of the conductance of some kinds of negative-resistance semiconductor types of electron discharge elements. This graph shows the kind of variation with frequency to be expected. All of the electron discharge elements are presumed to exhibit negative conductance (or resistance) in a frequency band including the desired operating frequency $f_0$. All of the elements also show this negative conductance to be decreasing in magnitude and becoming positive at high frequencies (e.g.: $f_s$) far above the desired band. Some devices also show reduced or vanishing negative conductance effects at lower frequencies, well separated from the band in which the device is intended to be used.

In order to avoid spurious oscillations, the new networks described herein are designed so that all of the normal resonant modes except the one desired occur at higher or lower bands of frequency than the desired operating frequency band. Thus, if the spurious modes have frequencies in the general vicinity of $f_s$ or higher, no oscillations can occur in such modes because the electron discharge elements have only positive or very small negative conductance at such frequencies. It is thus also possible to avoid oscillation at frequencies where there is a small residual negative conductance near the cross-over such as $f_s'$ on FIG. 1, because circuit losses presented to the electron discharge element can be sufficient to prevent oscillation in such cases.

It has also been found that the presence of strong oscillations at one frequency can cause the suppression of undesired modes of oscillation which might occur at other frequencies in other modes, even if the devices exhibit negative resistance effects at these other frequencies when not oscillating strongly. All negative resistance devices are nonlinear such that when strongly oscillating at one frequency, the alternating voltage periodically drives the device into positive-resistance portions of its current-voltage characteristic curve. In fact, when a negative-resistance device is driven by a strong alternating voltage of such a magnitude as to extract the maximum useful power at the driving frequency, it is often found that the time-average value of its negative conductance has vanished. With slightly higher alternating voltage applied, the time-average conductance is positive. Under such conditions, oscillations at other frequencies may see no effective negative resistance and will not start.

SUMMARY OF THE INVENTION

This invention relates in general to microwave generators and amplifiers of power and in particular to circuits and mounting structures for employing an electron discharge element to generate or amplify microwave energy. A fundamental object of this invention is to provide useful circuits and mounting structures for an element of the electron discharge type so that it will provide a single high frequency signal either in an oscillation state or in synchronism under RF drive to provide a faithfully amplified replica of an input signal, and with a power gain capability.

Another object is to provide an electrical circuit for an electron discharge device which allows a wider mechanical tuning range in the case of an oscillator or increased frequency band-width or mechnical tuning range in the case of an amplifier than may be obtained with prior techniques.

Another object of the invention is to provide an electrical circuit for the electron discharge device which is less sensitive than prior circuits to input voltage variations or pulling effect from specified and limited load mismatches.

Another object of the invention is to provide a reduced degree of variation in frequency due to temperature changes.

DESCRIPTION OF THE INVENTION

Exemplary embodiments of the invention, and methods to make them, are described with reference to the accompanying drawings, in which.

Figure 2:
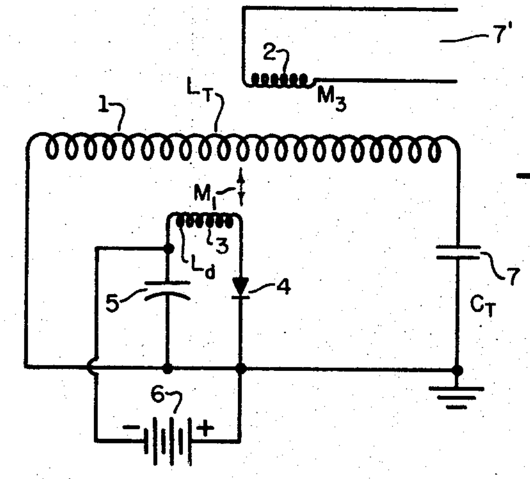
FIG. 2 illustrates an equivalent circuit of one class of network in accordance with this invention.
Figure 3:
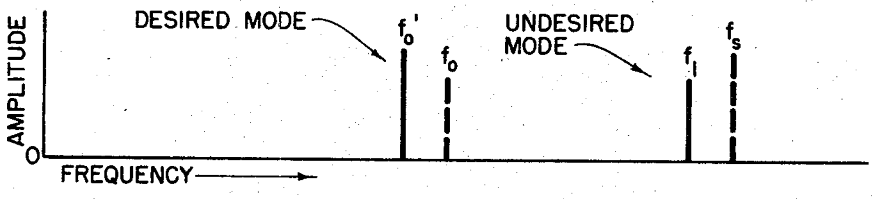
Figure 4:
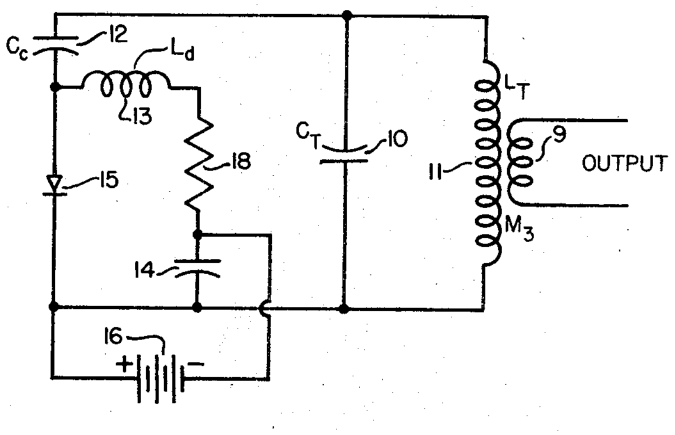
Figure 5:
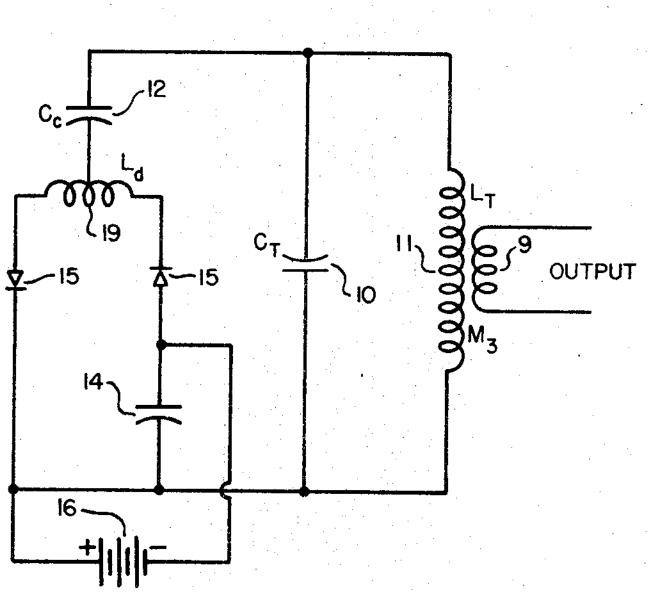
Figure 6:
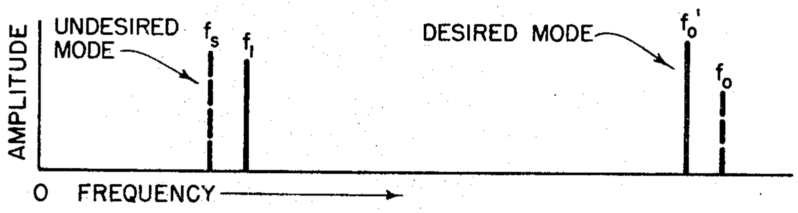
Figure 7:
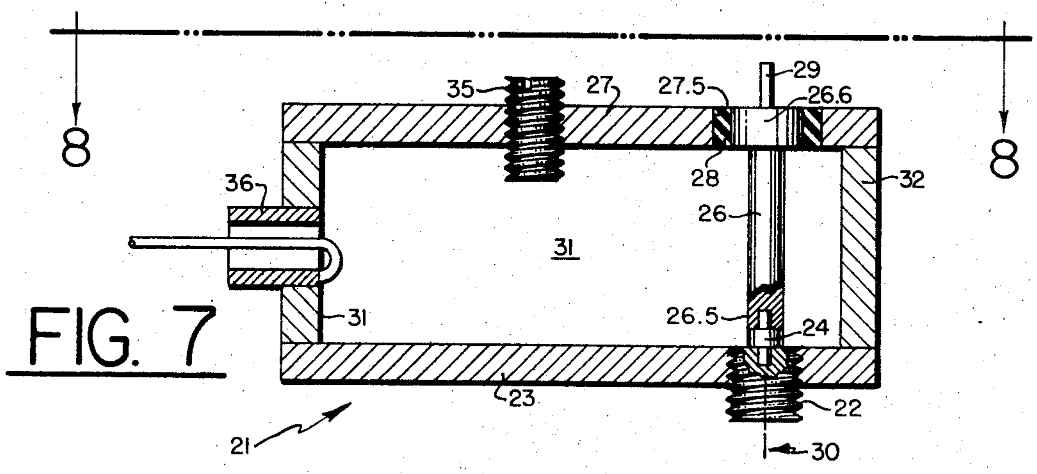
Figure 8:
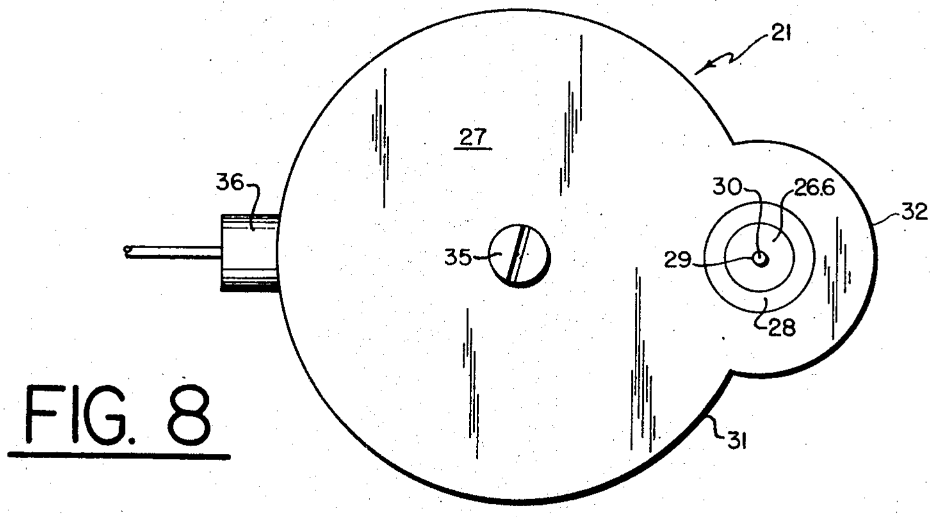

FIG. 3 graphically represents an example of the undesired frequencies at the higher end of the spectrum relative to the desired frequencies;

FIG. 4 illustrates another equivalent circuit in accordance with this invention;

FIG. 5 illustrates a variation of the embodiment of FIG. 4;

FIG. 6 graphically represents an example of undesired frequencies at the lower end of the spectrum relative to the desired frequencies;

FIG. 7 is a cross-section through a microwave embodiment of the circuit of FIG. 2 employing a single cavity resonator;

FIG. 8 is a top view of FIG. 7 taken along line 8—8; and

Figure 9:
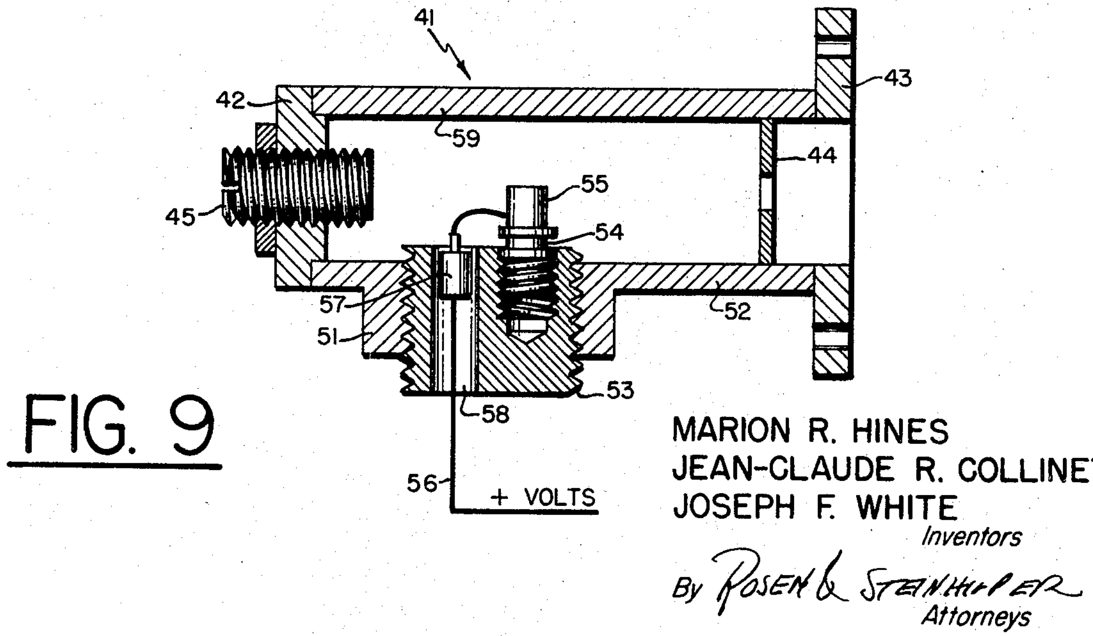

FIG. 9 is a cross-section through a microwave embodiment of the circuit of FIG. 4.

FIG. 2 shows an equivalent circuit of one class of network designed according to this invention, shown here in lumped-element circuit form for purposes of explanation. A microwave-structure embodiment of this network is shown in FIGS. 7 and 8. The electron discharge element (hereinafter sometimes called the "active element") is shown in FIG. 2 as a semiconductor diode 4. This diode is biased through an inductor 3 ($L_d$), by-passed to ground through a capacitor 5, by a bias battery 6 connected effectively across the by-pass capacitor. The inductance $L_d$ represents the inductance of the biasing and mounting means of the diode 4.

A larger inductor 1, of value, $L_T$ is in a primary resonator circuit which is resonated in a band including the desired frequency $f_0$ by the series capacitor 7 ($C_T$). The resonance frequency may be calculated by the formula $$f_0=\frac{1}{2\pi\sqrt{L_TC_T}}$$

The smaller inductor 3 has a mutual inductance $M_1$ with the larger inductor 1.

An output line 7' is coupled through output inductor 2 and mutual inductance $M_3$ to the primary resonator $L_T$, $C_T$. The diode 4 has a capacitance $C_d$ and there will be a resonant frequency $f_s$ computed by the formula $$f_s=\frac{1}{2\pi\sqrt{L_dC_d}}$$

This is the natural resonant frequency of the diode in its biasing and mounting means.

A complex network of this kind containing several resonant loops coupled together will normally have as many resonant or "normal" modes as there are resonant loops. Because of interaction among the loops, however, these normal modes are at somewhat different frequencies than would be found in the individual loops if they were not coupled together. Any one such mode will normally involve circulating currents flowing in all of the loops simultaneously. The various distinct modes may be distinguished by different frequencies and by different phase difference relationships of the currents among the various loops. Suppose that the outer (primary resonator) loop containing inductor 1 and capacitor 7 has a resonant frequency $f_0$ and that the individual diode loop has a nominal or "natural" resonant frequency $f_s$ which is higher, perhaps on the order of 2 $f_0$. A complete analysis of the total network will show two resonant modes $f_0'$ and $f_1$ at frequencies approximately as shown in FIG. 3. This shows the line spectrum of such modes. The mode near $f_0$ will be perturbed to a slightly lower frequency $f_0'$. In addition there will be another mode $f_1$ in the band of frequencies near $f_s$. The band containing this upper mode will lie near $f_s$. The lower-frequency mode $f_0'$ is the desired frequency mode. According to this invention the negative conductance properties of the diode 4 should be substantially ineffective at frequencies near $f_s$ so that oscillations are not possible in this mode.

However, if the diode has substantially negative resistance in the band of lower frequencies including $f_0$, frequencies in this band (including $f_0'$) can be coupled into the primary resonator loop of inductor 1 so that the network may oscillate or amplify using the low-frequency mode only. This feature of mode separation enables the use of a negative-resistance diode in an oscillator circuit which is tunable, compact and inexpensive. The operating frequency is essentially determined by the passive tuning elements $L_T$ and $C_T$ of the primary resonator, being only slightly perturbed by variations in diode characteristics. When the primary resonator has a high quality factor (Q) the coupling inductance $M_1$ may be made very small, to minimize the amount of this perturbation. This feature results in an oscillator whose frequency is highly stable, and highly independent of variations in temperature and bias voltage. It is also found that a high-Q primary resonator used in this manner is effective in reducing noise perturbations of the oscillator or amplifier, giving highly pure output signals. The invention thus provides a new and useful solid state microwave generator.

If the inductor $L_d$ (FIG. 2) is made larger than is apparent from the above discussion, such that the resonant frequency $f_s$ due to $L_d$ and $C_d$ is lower than $f_0$ (see FIG. 6), then the same principles of mode separation are applicable. Such a network would be suitable for use with Read or simple Gunn diodes, for example, which are normally incapable of oscillating at very low frequencies.

Figure 1:
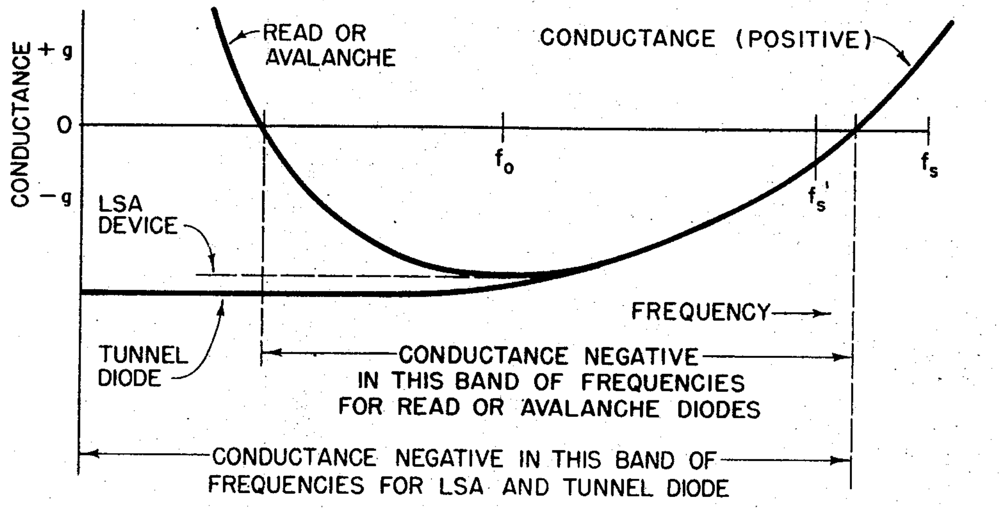
FIG. 1 shows the above-referenced graph of conductance variation vs. frequency.

FIG. 4 illustrates an alternative circuit arrangement which can provide an equivalent degree of mode separation. In this network the primary resonator including inductor 11 ($L_T$) and capacitor 10 ($C_T$) is resonant at or near the desired frequency $f_0$. An output line 9 is inductively coupled to the inductor 11. An active electron discharge element, here represented as a diode 15, is coupled capacitively through a small capacitor 12 ($C_c$), instead of inductively as in FIG. 2. The loop containing the diode is intended to be resonant at or near a frequency where the active element 15 is substantially ineffective as a power generator or negative resistance element. By-pass capacitor 14 completes the loop for A.C., and bias voltage from a battery 16 is applied effectively across this capacitor. In this class of network, it may be more appropriate if the local diode resonant loop has a natural resonant frequency lower than $f_0$. Such a circuit is suitable for the Read or avalanche diode element, which is not effective as a negative conductance at the lowest frequencies (see FIG. 1). It is also suitable for use with simple Gunn-type diodes in which the electron transit time corresponds roughly to a wave period at the frequency $f_0$.

The mode spectrum for such a circuit is illustrated in FIG. 6. The resistor 18 shown in the local diode loop may be intentionally inserted or it may represent the inherent lossiness of the inductor 13. Such a resistor may be of additional help in suppressing undesired modes of resonance.

FIG. 5 shows a method of coupling two negative-resistance elements into the circuit of FIG. 4. As in FIG. 4, two such diodes (in pairs 15, 15) may be coupled into a single primary resonator ($L_TC_T$). In this case, two diodes 15, 15 biased in series through a small inductor 19 are shown. This inductor will desirably have a very small value of inductance ($L_d$) and in the limit may represent only the unavoidable inductance of a direct electrical connection (i.e.: the diode mounting and biasing means). In this case, the local diode loop resonant frequency is that of the two diode capacitances in series with the inductor 19. This will be most suitable for local resonant frequencies ($f_s$) much higher than the desired frequency ($f_0$), giving a spectrum as shown in FIG. 3. The coupling current path from the common terminal 19 through the coupling capacitor 12 divides between the two diodes which are connected each in series with that capacitor.

The basic circuits of FIGS. 2, 4 and 5 are suitable as described for use as high frequency oscillators. Such circuits can also be used as negative-resistance amplifiers, by techniques now well known in the field. To do so, a signal generated elsewhere may be injected through a ferrit circulator (not shown) into the output line 7' (FIG. 2) or 9 (FIG. 4). This signal wave can be caused to be reflected from the network along the line with a power greater than that applied. This amplified reflected wave can be separated externally in a known manner by the use of the ferrite circulator. If the mutual coupling inductance ($M_3$ in FIGS. 2 and 4) is made sufficiently large, self oscillation of such a network can usually be prevented, and amplification will, nevertheless, be obtainable.

In accordance with known principles oscillators of the types herein described may be "injection locked" by a technique similar to that described above for amplification. Such oscillators may be caused to assume the identical frequency of an injected signal wave, giving an output power greater than the power injected.

It may be noted that the circuits of FIGS. 2, 4 and 5 might also include two or more diodes in series where only one is shown in each local diode loop. Similarly each electron discharge element in each of these circuits might consist of two or more small diodes in shunt in place of the one shown.

The discussion up to this point has been concerned with schematic diagrams using lumped-element networks of the kind which are common for radio frequencies up to the lower parts of the UHF bands. These have been useful in explaining the behavior of these new circuits. However, many applications of this invention are at much higher frequencies, extending from the UHF bands through the microwave bands up to 10,000 MHz. and beyond. Hollow cavity resonators are particularly useful for such applications, since they can exhibit extremely high Q factors, and high stored energy. Some distributed network element configurations of the circuits of FIGS. 2 and 4 will now be shown as examples according to the invention of networks used in practice in the microwave region.

FIGS. 7 and 8 show a cylindrical hollow primary resonator cavity, generally designated by the reference character 21, having a semiconductor diode 24 in an oscillator circuit which is coupled directly into the cavity. The equivalent circuit is that shown in FIG. 2. A terminal member 22 is threaded into the lower wall 23 of the cavity and serves as one terminal for the diode 24 which is grounded to the cavity wall. A post 26 extends from the upper cavity wall 27 into the cavity 21 toward the grounded terminal member 22, and the diode 24 is held between the inner end 26.5 of the post and the grounded terminal member 22. The upper end of the post has an expanded-diameter boss 26.6 which is held in an aperture 27.5 in the upper wall 27 by a dielectric ring 28. An extension 29 of the post outside the cavity is used for the application of bias voltage to the diode 24.

The cylindrical wall 31 is apertured about the post 26 and a sub-cylindrical cavity 32, having the post 26 on its axis 30, is fitted to the primary resonator cavity 21. This structure is exemplary only; those skilled in the art will know that another configurations are useful.

The post 26 corresponds to the inductor 3 with inductance $L_d$ in FIG. 2; in structures as shown in FIG. 7, $L_dC_d$ will normally be resonant at frequencies below the resonant frequency of the cavity 21. The dielectric ring 28 corresponds to the dielectric of capacitor 5 in FIG. 2; and the natural resonant frequency $f_s$ of the diode 24 in its biasing and mounting means is computed in the same manner as is described in connection with FIG. 2. The post 26 is coupled by a mutual inductance ($M_1$ as in FIG. 2) directly with the primary resonator cavity 21.

A tuning post (or screw) 35 threaded into the top wall 27 is used to tune the cavity. A coaxial output fitting 36, which may be as illustrated or of any other known variety, serves to extract energy at the desired frequency $f_0$ from the cavity. The functions of the tuning post 35 are well known, and will not be described. However, it is noted that the cavity can be temperature compensated and to this end the tuning post may be designed to take part in the compensation process. For example, the tuning screw can be made of a metal which will expand and extend further into the cavity as the cavity itself expands with increasing temperature, in order to minimize a drop in the frequency of resonance of the cavity.

The invention effects direct coupling of an oscillator circuit to a resonant cavity, thereby allowing maximum advantage to be taken of the High Q capabilities of cavity resonators. The bandwidth of the resonance of the cavity is normally very much narrower than the frequency range over which the oscillator diode exhibits negative resistance (or conductance). This provides a high energy storage primary resonator, which makes possible precise control of the desired frequency $f_0$ and at the same time increases the ability of the designer to avoid spurious modes of oscillation. Thus, the combination of an electron discharge device oscillator which can be biased for negative resistance at frequencies in a selected band and a high energy storage primary resonator to which the oscillator is directly coupled for precise tuning at a given frequency in a reduced bandwidth of electrical resonance in that band, provides a novel microwave generator or amplifier having many advantageous properties. Among these advantages are:

(1) The basic oscillator circuit can be biased so that undesired modes due to its biasing and mounting structure fall far outside the selected frequency band, and can be substantially prevented from arising;

(2) The primary resonator can sharply reject undesired modes;

(3) The primary resonator can be mechanically tuned;

(4) The primary resonator can be temperature stabilized;

(5) The oscillator device can be readily cooled, since the structure is by nature a heat sink.

In FIG. 9 a section of rectangular waveguide 41 is closed by an end wall 42 at one end and fitted with flange means 43 at the other for attachment to other waveguide members (not shown). An iris 44 is located in the waveguide section, near the flange means 43. A tuning screw 45 is threaded through the end wall 42. This structure is a simple rectangular waveguide resonator. It is used in FIG. 9 as the primary resonator of a circuit which is essentially according to FIG. 4.

A diode 54 is screw mounted in a heat sink 53 which in turn is threaded into the lower wide wall 52 of the waveguide 41, where it is supported in a collar 51 which is part of the wall. An extended coupling electrode, or "hat" 55 serves to couple the diode oscillator capacitively to the primary resonator. A bias-voltage lead 56 passing through a by-pass capacitor 57 in an aperture 58 in the heat sink 53 serves to apply bias voltage to the coupling electrode 55. Again, as in the embodiment of FIGS. 7 and 8, the oscillating electron discharge device is coupled directly to the primary cavity resonator. The capacitance between the extended electrode 55 and the confronting wide wall 59 of the waveguide corresponds to capacitor 12 ($C_c$) in FIG. 4; and the by-pass capacitor 57 corresponds to capacitor 14 in FIG. 4.

The tuning screw 45 located in the end wall 42 is used to vary the inductance of the cavity. When the screw goes in, the inductance of the cavity is reduced, and the resonant frequency $f_0$ goes up. The cavity can be capacitively tuned with a tuning post or screw located in the top wall 59 (not shown). In that case, when the screw goes in, the relative capacitance of the cavity goes up, and the resonant frequency $f_0$ goes down.

The structure of FIGS. 7 and 8 may be modified to include a second set of diode mounting electrodes similar to those shown at 22 and 26. Such an electrode structure may be mounted elsewhere about the circumference of the cavity 21. A second diode, which can be of the varactor type, can be mounted (in place of diode 24) between the second set of electrodes. As is well-known in the art, a varactor diode exhibits a variable capacitance as its bias voltage is changed. Because of the coupling between the cavity and the diode, this varactor capacitance will perturb the resonant frequency of the cavity in a voltage-controlled variable manner, to tune the cavity electronically. Similarly, by including an additional diode and its mounting in the cavity of FIG. 9, that cavity can likewise be tuned electronically. The mounting and biasing means can be similar to that shown for diode 54, a varactor being substituted.

We claim:

1. In a high frequency electrical network for operation in a given band of electric wave frequencies comprising at least one discharge element which when suitably biased exhibits negative resistance in said band, biasing means and mounting means for said element having inductance of magnitude such that the range of natural resonant frequencies of said element in said means is substantially different from said given operating frequency band and translating means coupled to said element for extracting high frequency energy in said band from said element, the improvement in which said translating means comprises a hollow-cavity resonator having a bandwidth of electrical resonance which is relatively narrow compared to and lies within said band, means coupling said discharge element directly to said cavity, and means to extract said high frequency energy in said frequency band from said cavity resonator.

2. A network according to claim 1 including means to tune said cavity to a selected bandwidth of electrical resonance within said band.

3. A network according to claim 1 in which said discharge element is capacitively coupled to said cavity.

4. A network according to claim 3 in which said cavity has first and second confronting walls and in which said discharge element is a diode, said diode is mounted within the cavity with one electrode directly connected to the first wall, and a second electrode of said diode confronts said second wall, and including electrical conductor means to apply a bias voltage to said second electrode.

5. A network according to claim 1 in which said discharge element is a diode and is inductively coupled to said cavity.

6. A network according to claim 5 in which said cavity has first and second confronting walls, said diode is mounted within the cavity with one electrode directly connected to the first wall, an elongated electrical conductor extends from a second electrode of said diode across said cavity to but is electrically insulated from the second wall, and including electrical conductor means to apply a bias voltage to said second electrode.

7. A network according to claim 6 in which said second wall has an aperture lined with dielectric material through which said elongated conductor extends, and an extension of said elongated conductor outside said cavity constitutes said bias-voltage conductor.

8. A network according to claim 2 in which mechanical tuning means comprised of an electrical conductor variably extendible into said cavity provides tuning means.

9. A network according to claim 2 in which a voltage-variable capacitive electrical device is installed in said cavity with means to apply a voltage to vary the capacitance thereof for tuning said cavity.

10. A network according to claim 4 in which an aperture is provided through a wall of said cavity, with dielectric material in said aperture through which said electrical conductor means passes for applying bias voltage to said second electrode.

11. A supporting structure for a microwave circuit including an electron discharge device having at least two electrodes, said structure comprising: a body of electrically conductive material, means mounting said device on a surface of said body so that said device extends from said surface with a first electrode thereof coupled to said body and a second electrode thereof more remote and electricaly insulated from said body; a passage through said body from a region adjacent said device to a remote region, and an electrical conductor passing through said passage having one end connected to said second electrode and the other end accessible at said remote region; and means to affix said structure to a wall of a hollow wave-confining member having an aperture in said wall, said affixing means being disposed on said body with said surface, said device and said region adjacent thereto at one side thereof, and said remote region at the opposite side thereof so that when said structure is affixed to said wall at least said second electrode of said device will directly confront the interior of said member, and said remote region will be available from outside said member.

12. A supporting structure for a microwave circuit including an electron discharge device having at least two electrodes, said structure comprising: a body of electrically-conductive material, means mounting said device on said body with a first electrode thereof coupled to said body and a second electrode thereof electrically insulated from said body; a passage through said body from a region adjacent said device to a remote region, and an electrical conductor passing through said passage having one end connected to said second electrode and the other end accessible at said remote region; means to affix said structure to a wall of a hollow wave-confining member having an aperture in said wall, said affixing means being disposed on said body with said device and said region adjacent thereto at one side thereof, and said remote region at the opposite side thereof, so that when said structure is affixed to said wall at least said second electrode of said device will directly confront the interior of said member, and said remote region will be available from outside said member, in which said body is substantially cylindrical with an end surface on which said device and said region adjacent thereto are located, and said affixing means is circumferentially located about said body a distance removed from said end, said device being located between the cylinder axis and the periphery of said end surface so that when said device is installed in said wall of said wave-confining member rotation of said body in said aperture will alter the physical location of said device relative to the interior of said member, for adjusting the coupling between said device and an RF field within said member.

13. A structure according to claim 12 comprising a microwave circuit which includes said device for operation in a given band of electric wave frequencies, in combination with a wave-confining member which is a hollow-cavity resonator having a bandwidth of electrical resonance which is unique for said resonator, and means including said affixing means to adjust the coupling between said device and an RF field within said resonator.

14. A structure according to claim 11 in which said device is a semiconductor having said first electrode affixed directly to said surface of said body.

15. A structure according to claim 11 in which a part of said conductor follows a curved path from said passage to said second electrode, which path is located entirely within said wave-confining member when said structure is affixed to said wall.

16. A structure according to claim 12 in which said conductor follows a curved path from said passage to said second electrode, which path is located entirely within said wave-confining member when said device is installed in said wall of said wave-confining member and is oriented relative thereto by rotation of said body in said aperture.

References Cited

UNITED STATES PATENTS

| | | | |
|---|---|---|---|
| 3,031,626 | 4/1962 | Dazey | 331—97 X |
| 3,141,141 | 7/1964 | Sharpless | 331—107 |
| 3,254,309 | 5/1966 | Miller | 331—107 X |
| 3,356,866 | 12/1967 | Misawa | 331—107 X |

ROY LAKE, Primary Examiner

S. H. GRIMM, Assistant Examiner

U.S. Cl. X.R.

330—34, 56, 61; 331—107, 177; 333—81